US008713524B2

(12) United States Patent
Prakriya et al.

(10) Patent No.: US 8,713,524 B2
(45) Date of Patent: Apr. 29, 2014

(54) MEMORY MANAGEMENT CONFIGURATION

(75) Inventors: Mahesh Prakriya, Redmond, WA (US); Robin M. Maffeo, Redmond, WA (US); Patrick H. Dussud, Bellevue, WA (US)

(73) Assignee: Microsoft Corporation, Redmond, VA (US)

( * ) Notice: Subject to any disclaimer, the term of this patent is extended or adjusted under 35 U.S.C. 154(b) by 1427 days.

(21) Appl. No.: 11/099,841

(22) Filed: Apr. 6, 2005

(65) Prior Publication Data

US 2006/0230387 A1 Oct. 12, 2006

(51) Int. Cl.
*G06F 9/44* (2006.01)

(52) U.S. Cl.
USPC .............................. 717/121; 717/101; 717/127

(58) Field of Classification Search
None
See application file for complete search history.

(56) References Cited

U.S. PATENT DOCUMENTS

| | | | |
|---|---|---|---|
| 5,946,487 A | 8/1999 | Dangelo | |
| 5,948,113 A | 9/1999 | Johnson et al. | |
| 5,999,732 A | 12/1999 | Bak et al. | |
| 6,065,020 A * | 5/2000 | Dussud | 1/1 |
| 6,300,962 B1 | 10/2001 | Wishoff et al. | |
| 6,502,109 B1 * | 12/2002 | Aravamudan et al. | 707/206 |
| 6,629,113 B1 * | 9/2003 | Lawrence | 707/206 |
| 6,718,371 B1 * | 4/2004 | Lowry et al. | 709/213 |
| 6,854,046 B1 * | 2/2005 | Evans et al. | 711/203 |
| 6,865,585 B1 * | 3/2005 | Dussud | 707/999.003 |
| 6,883,172 B1 | 4/2005 | Angeline et al. | |
| 7,100,015 B1 | 8/2006 | Mathiske et al. | |
| 7,139,894 B1 * | 11/2006 | Mensching et al. | 711/170 |
| 7,162,605 B2 | 1/2007 | Achanta et al. | |
| 7,174,354 B2 * | 2/2007 | Andreasson | 1/1 |
| 7,406,699 B2 * | 7/2008 | Liu et al. | 719/328 |
| 7,418,718 B2 * | 8/2008 | Liu et al. | 719/328 |
| 7,428,725 B2 * | 9/2008 | Niyogi et al. | 717/121 |
| 7,603,488 B1 * | 10/2009 | Gravenstein et al. | 710/22 |
| 7,707,232 B2 | 4/2010 | Dussud et al. | |
| 7,730,465 B2 | 6/2010 | Sutter et al. | |
| 7,769,974 B2 * | 8/2010 | Bhansali et al. | 717/127 |
| 7,779,389 B2 * | 8/2010 | Markov et al. | 717/121 |
| 7,805,706 B1 * | 9/2010 | Ly et al. | 717/121 |
| 7,822,938 B2 * | 10/2010 | Dussud et al. | 711/170 |
| 7,836,458 B1 * | 11/2010 | Gwozdz et al. | 717/174 |
| 8,104,080 B2 * | 1/2012 | Burns et al. | 717/121 |
| 2003/0212719 A1 * | 11/2003 | Yasuda et al. | 707/206 |
| 2003/0225917 A1 * | 12/2003 | Partamian et al. | 709/310 |
| 2003/0236961 A1 * | 12/2003 | Qiu et al. | 711/170 |
| 2004/0003388 A1 * | 1/2004 | Jacquemot et al. | 717/174 |
| 2004/0060041 A1 | 3/2004 | Demsey et al. | |
| 2004/0064830 A1 * | 4/2004 | Irving et al. | 719/328 |
| 2004/0073764 A1 * | 4/2004 | Andreasson | 711/170 |
| 2004/0098724 A1 | 5/2004 | Demsey et al. | |
| 2004/0158589 A1 * | 8/2004 | Liang et al. | 707/206 |

(Continued)

OTHER PUBLICATIONS

S. Vikram, "Code Optimization: Memory Management in .NET, part 2", Dec. 19, 2003, TechRepublic—A ZDNet Tech Community, pp. 1-4.*

(Continued)

*Primary Examiner* — Thuy Dao
*Assistant Examiner* — Ben C Wang
(74) *Attorney, Agent, or Firm* — Kevin Sullivan; Kate Drakos; Micky Minhas

(57) ABSTRACT

Dynamic memory management configuration enables certain behavior of an application to be controlled without touching or affecting any executable portion of the application.

15 Claims, 5 Drawing Sheets

(56) References Cited

U.S. PATENT DOCUMENTS

| | | | |
|---|---|---|---|
| 2004/0199927 A1* | 10/2004 | Liu et al. | 719/328 |
| 2004/0216130 A1 | 10/2004 | Keller et al. | |
| 2004/0237064 A1* | 11/2004 | Liu et al. | 717/101 |
| 2004/0255237 A1 | 12/2004 | Tong | |
| 2005/0222969 A1* | 10/2005 | Yip et al. | 707/1 |
| 2005/0223189 A1* | 10/2005 | Khan et al. | 711/203 |
| 2005/0268049 A1* | 12/2005 | De Lange | 711/149 |
| 2006/0085494 A1* | 4/2006 | Dussud et al. | 707/206 |
| 2006/0101314 A1* | 5/2006 | Husbands et al. | 714/100 |
| 2006/0101439 A1* | 5/2006 | Massarenti et al. | 717/148 |
| 2006/0143421 A1* | 6/2006 | Subramoney et al. | 711/170 |
| 2006/0265438 A1* | 11/2006 | Shankar et al. | 707/206 |
| 2007/0006223 A1* | 1/2007 | Wetherly et al. | 717/101 |
| 2007/0011658 A1* | 1/2007 | Stephens | 717/127 |
| 2007/0022268 A1 | 1/2007 | Stephens | |
| 2007/0094671 A1* | 4/2007 | Stephens et al. | 718/105 |
| 2008/0184200 A1* | 7/2008 | Burns et al. | 717/121 |
| 2008/0184201 A1* | 7/2008 | Burns et al. | 717/121 |
| 2008/0263505 A1* | 10/2008 | StClair et al. | 717/101 |
| 2008/0281885 A1* | 11/2008 | Dussud | 707/206 |
| 2009/0307292 A1* | 12/2009 | Li et al. | 707/206 |
| 2010/0011357 A1* | 1/2010 | Ramamurthy | 718/1 |
| 2010/0287217 A1* | 11/2010 | Borchers et al. | 707/813 |
| 2011/0314439 A1* | 12/2011 | Colgrave et al. | 717/101 |

OTHER PUBLICATIONS

Emmanuel Schanzer, "Performance Considerations for Run-Time Technologies in the .NET Framework", Aug. 2001, Microsoft Corporation, pp. 1-23.*

Steven Pratschner, "Microsoft .NET: Implement a Custom Common Language Runtime Host for Your Managed App.", Mar. 2001, MSDN Magazine, Microsoft Corporation, pp. 1-8.*

Steven Pratschner, "Microsoft .NET: Implement a Custom Common Language Runtime Host for Your Managed App", the Mar. 2001 Isssue of MSDN Magazine, pp. 1-8, <http://msdn.microsoft.com/en-us/magazine/cc301479(printer).aspx>.*

Soman et al., "Dynamic Selection of Application-Specific Garbage Collectors", ISMM'04, Oct. 24-25, 2004, 2004 ACM, pp. 49-60 <http://dl.acm.org/citation.cfm?id=1029880>.*

Microsoft, "Implementing and Configuring Dynamic Memory", Microsoft Corporation, Oct. 2010, pp. 1-23; <http://download.microsoft.com/download/D/1/5/.../Implementing_and_Configuring_Dynamic_Memory_WP_SP1_final.pdf>.*

Jantz et al., "A Framework for Application Guidance in Virtual Memory Systems", 2013 ACM, VEE'13, Mar. 16-17, 2013, Houston, Texas, USA; pp. 155-165; <http://dl.acm.org/results.cfm?h=1&cfid=396631203&cftoken=47770437>.*

Gilani et al., "Aspectizing a Web Server for Adaption", 2007 IEEE, pp. 349-356; <http://ieeexplore.ieee.org/stamp/stamp.jsp?tp=&arnumber=4381570>.*

Microsoft Computer Dictionary, Copyright 1999, Fourth Edition, p. 28.

Darwen, "Converting Between Native and Managed Types", Aug. 30, 2004, 4 pages.

U.S. Appl. No. 11/188,395, Amendment After Final Rejection, dated Oct. 10, 2012, 12 pages.

U.S. Appl. No. 10/969,301, Notice of Allowance, mailed Aug. 3, 2010, 6 pages.

U.S. Appl. No. 10/969,301, Patent Board Decision, mailed Mar. 24, 2010, 10 pages.

U.S. Appl. No. 10/969,301, Rely Brief, filed Nov. 18, 2008, 6 pages.

U.S. Appl. No. 10/969,301, Examiner's Answer to Appeal Brief, dated Sep. 18, 2008, 24 pages.

U.S. Appl. No. 10/969,301, Appeal Brief, dated Jun. 25, 2008, 22 pages.

U.S. Appl. No. 10/969,301, Final Rejection, dated Sep. 25, 2007, 10 pages.

U.S. Appl. No. 10/969,301, Amendment, dated Jun. 11, 2007, 12 pages.

U.S. Appl. No. 10/969,301, Non-Final Rejection, dated Mar. 9, 2007, 10 pages.

U.S. Appl. No. 11/188,395, Final Rejection, dated Jul. 20, 2012, 20 pages.

U.S. Appl. No. 11/188,395, Amendment, dated Jun. 7, 2012, 13 pages.

U.S. Appl. No. 11/188,395, Non-Final Rejection, dated Feb. 7, 2012, 25 pages.

U.S. Appl. No. 11/188,395, Amendment, dated Jan. 14, 2011, 15 pages.

U.S. Appl. No. 11/188,395, Final Rejection, dated Oct. 14, 2010, 10 pages.

U.S. Appl. No. 11/188,395, Amendment, dated Sep. 9, 2010, 14 pages.

U.S. Appl. No. 11/188,395, Non-Final Rejection, dated Jun. 11, 2010, 26 pages.

U.S. Appl. No. 11/188,395, Amendment, dated Mar. 12, 2010, 10 pages.

U.S. Appl. No. 11/188,395, Non-Final Rejection, dated Dec. 11, 2009, 23 pages.

U.S. Appl. No. 11/188,395, Amendment, dated Jul. 21, 2009, 15 pages.

U.S. Appl. No. 11/188,395, Non-Final rejection, dated Jan. 21, 2009, 10 pages.

U.S. Appl. No. 11/188,395, Notice of Allowance dated Nov. 22, 2013, 15 pages.

* cited by examiner

MEMORY MANAGEMENT CONFIGURATION

DESCRIPTION OF THE DRAWINGS

The present invention will be described in accordance with the following figures.

DETAILED DESCRIPTION

Dynamic memory management configuration is described herein. More particularly, the description herein pertains to dynamically controlling certain behavior of an application based on, at least, performance and scalability of the application. Further, the dynamic control may be implemented without touching or affecting any executable portion of the application.

Figure 1:
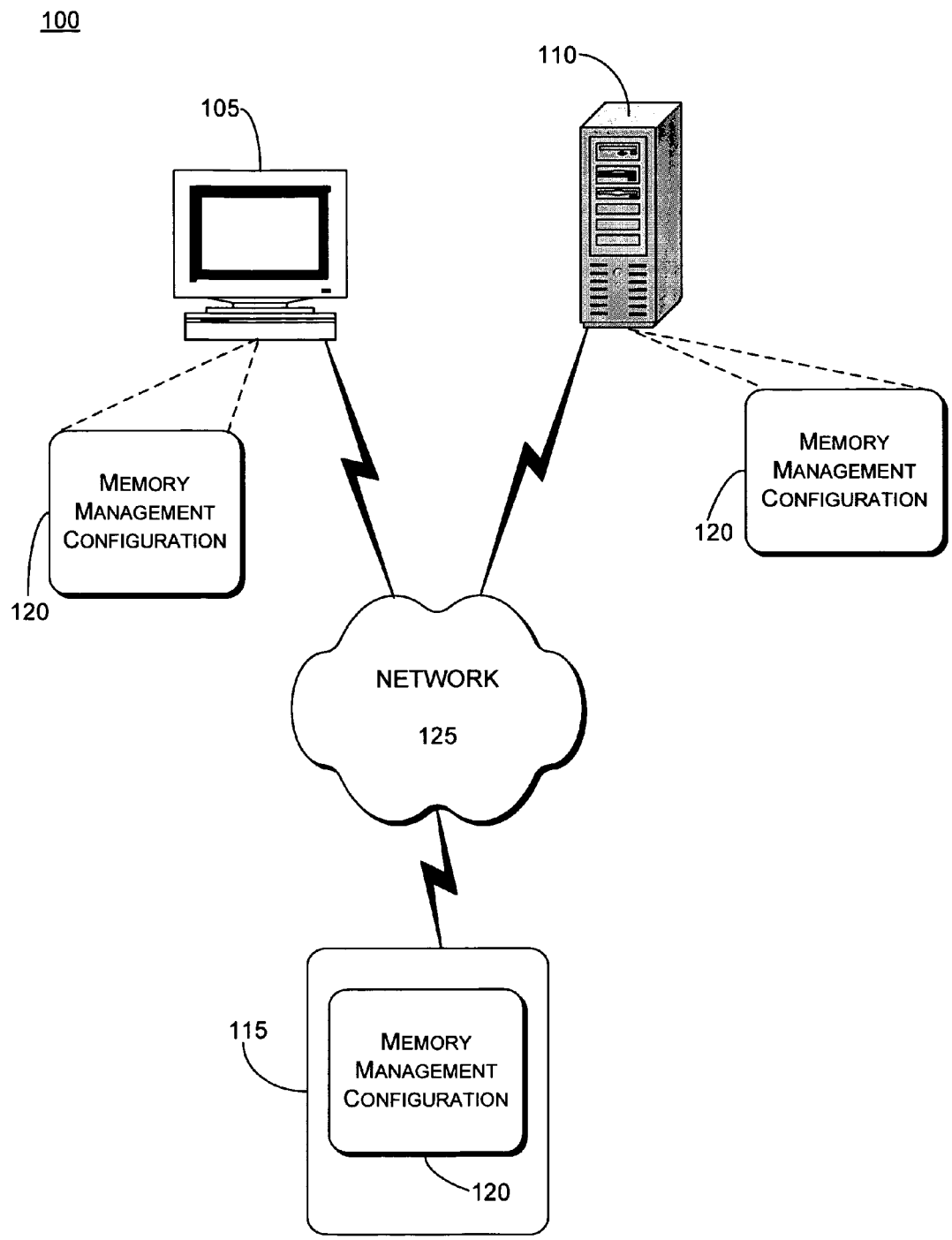
FIG. 1 shows devices communicating over a network, with the devices implementing example technologies for memory management configuration.

FIG. 1 shows example network environment 100 in which dynamic memory management configuration may be implemented. However, dynamic implementation of memory management configuration, according to at least one example, is not limited to network environments. Regardless, in FIG. 1, client device 105, server device 110, and "other" device 115 may be communicatively coupled to one another via network 125; and, further, at least one of client device 105, server device 110, and "other" device 115 may be capable of implementing dynamic memory management configuration 120, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115 in accordance with at least one implementation of dynamic memory management configuration 120. The data may be publicly available or alternatively restricted, e.g., restricted to only certain users or only if an appropriate subscription or licensing fee is paid. Server device 110 may be at least one of a network server, an application server, a web blade server, or any combination thereof. Typically, server device 110 is any device that may be a content source, and client device 105 is any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing dynamic memory management configuration 120 according to one or more of the examples described herein. That is, "other" device 115 may be any software-enabled computing or processing device that is capable of implementing dynamic memory management configuration for an application, program, function, or other assemblage of programmable and executable code in at least a managed execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125, may further utilize any of a variety of conventional network protocols, including public and/or proprietary protocols. Network 125 may include, for example, the Internet as well at least portions of one or more local area networks (also referred to, individually, as a "LAN"), such as 802.11 system; a personal area network (i.e., PAN), such as Bluetooth.

Computer architecture in at least one of devices 105, 110, and 115 has typically defined computing platforms in terms of hardware and software. Software for computing devices came to be categorized into groups, based on function, which include: a hardware abstraction layer (alternatively referred to as a "HAL"), an operating system (alternatively referred to as "OS"), and applications.

A runtime execution environment may refer to an isolated space, between the OS and an application, in which the application may execute specific tasks on at least one of processing device 105, 110, or 105. More particularly, the runtime execution environment is intended to enhance the reliability of the execution of applications on a growing range of processing devices including servers, desktop computers, laptop computers, and mobile processing devices by providing a layer of abstraction and services for an application running on such processing devices, and further providing the application with capabilities including memory management and configuration thereof.

A runtime execution environment may serve as at least one of an application programming and application execution platform. As an application programming platform, a runtime execution environment may compile targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages. As an application execution platform, a runtime execution environment may interpret compiled IL into native machine instructions. A runtime execution environment may utilize either an interpreter or a "just-in-time" (hereafter "JIT") compiler to execute such instructions. Regardless, the native machine instructions may then be directly executed by the CPU. Since IL is CPU-independent, IL may execute on any CPU platform as long as the OS running on that CPU platform hosts an appropriate runtime execution environment. Examples of runtime environments, to which dynamic memory management configuration 120 may pertain, include: Visual Basic® runtime environment; Java®. Virtual Machine runtime environment that is used to run, e.g., Java® routines; or Common Language Runtime (CLR) to compile, e.g., Microsoft .NET™ applications into machine language before executing a calling routine. However, such listing provides examples only. The example implementations are not limited to just these managed execution environments. Further, the example implementations are not just limited to managed execution environments, for one or more examples may be implemented within testing environments and/or unmanaged execution environments.

An application compiled into IL is referred to as "managed code," and therefore a runtime execution environment may be alternatively referred to as a "managed execution environment." It is noted that code that does not utilize a runtime execution environment to execute may be referred to as native code applications.

Figure 2:
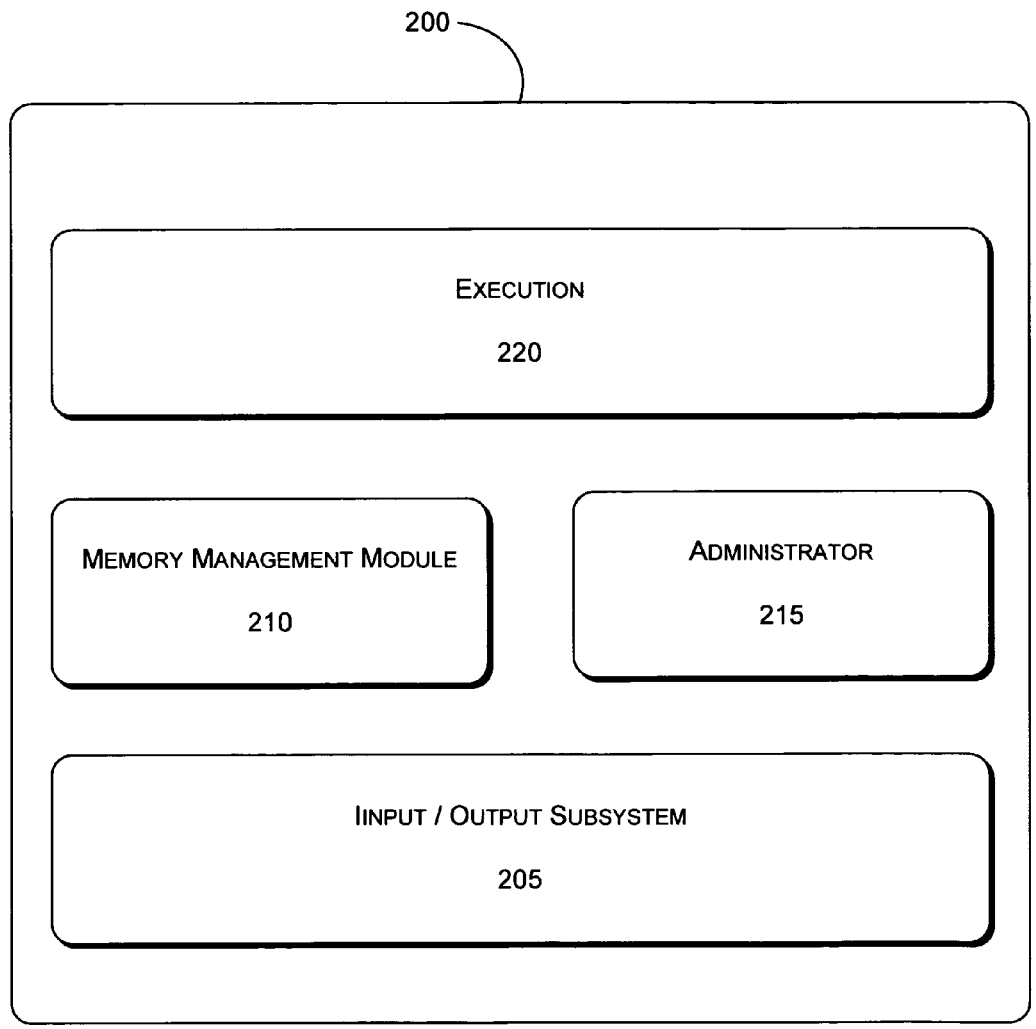
FIG. 2 shows an example of an execution environment for implementing example technologies for memory management configuration.

FIG. 2 shows an example of runtime execution environment 200 in which examples of dynamic memory management configuration 120 (see FIG. 1) may be implemented.

According to at least one example implementation, runtime execution environment 200 may facilitate execution of managed code for a computing device platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 also provides class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for the particular one of device 105, 110, and 115. Thus, at least one example of runtime execution environment 200 may implement the following: input/output (hereafter "I/O") routine management, memory management, administration, and service routine management. Thus, runtime execution environment 200 may include I/O component 205, at least one memory management component 210, administrator 215, and execution component 220. These components, which are to be described in further detail below, are provided as examples. The examples are not intended to be limiting to any particular implementation, and no such inference should be made. Further, the components may be implemented in examples of runtime execution environment 200 in various combinations and configurations thereof.

I/O component 205 of runtime execution environment 200 may provide asynchronous access to data sources (i.e., processor and peripherals) associated with the computing device platform. More particularly, I/O component 205 may provide runtime execution environment 200 with robust system throughput and further streamline performance of code from which an I/O request originates.

Memory management component 210 may be regarded as a "garbage collector." Garbage collection may be regarded as a robust feature of managed code execution environments by which an object is automatically freed (i.e., de-allocated) if an object is no longer used by any applications, upon a sweep or scan of a memory heap. In at least one example of memory management component 210, a sweep of free memory heap may be implemented as a linear search. Such implementation may be well-suited for an example of a computing device platform for which memory size is constrained and for which a delay in completion of a sweep may be perceived by a user of a corresponding device.

Further functions implemented by memory management component 210 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Administrator 215 may refer to a module within runtime execution environment 220 that serves to receive executable code for execution within the managed execution environment. Further, in accordance with at least one example implementation of memory management configuration 120, administrator 215 may dynamically control the behavior of the application within runtime execution environment 220 without touching or affecting any executable portion of the application, at compile time, initial runtime, or at any time thereafter during execution of an application.

Execution component 220 may enable execution of managed code for the computing device platform. Execution component 220 may be regarded as the environment in which execution of the code of the application is implemented, and in which runtime services (e.g., device access and memory management) may be provided.

Figure 3:
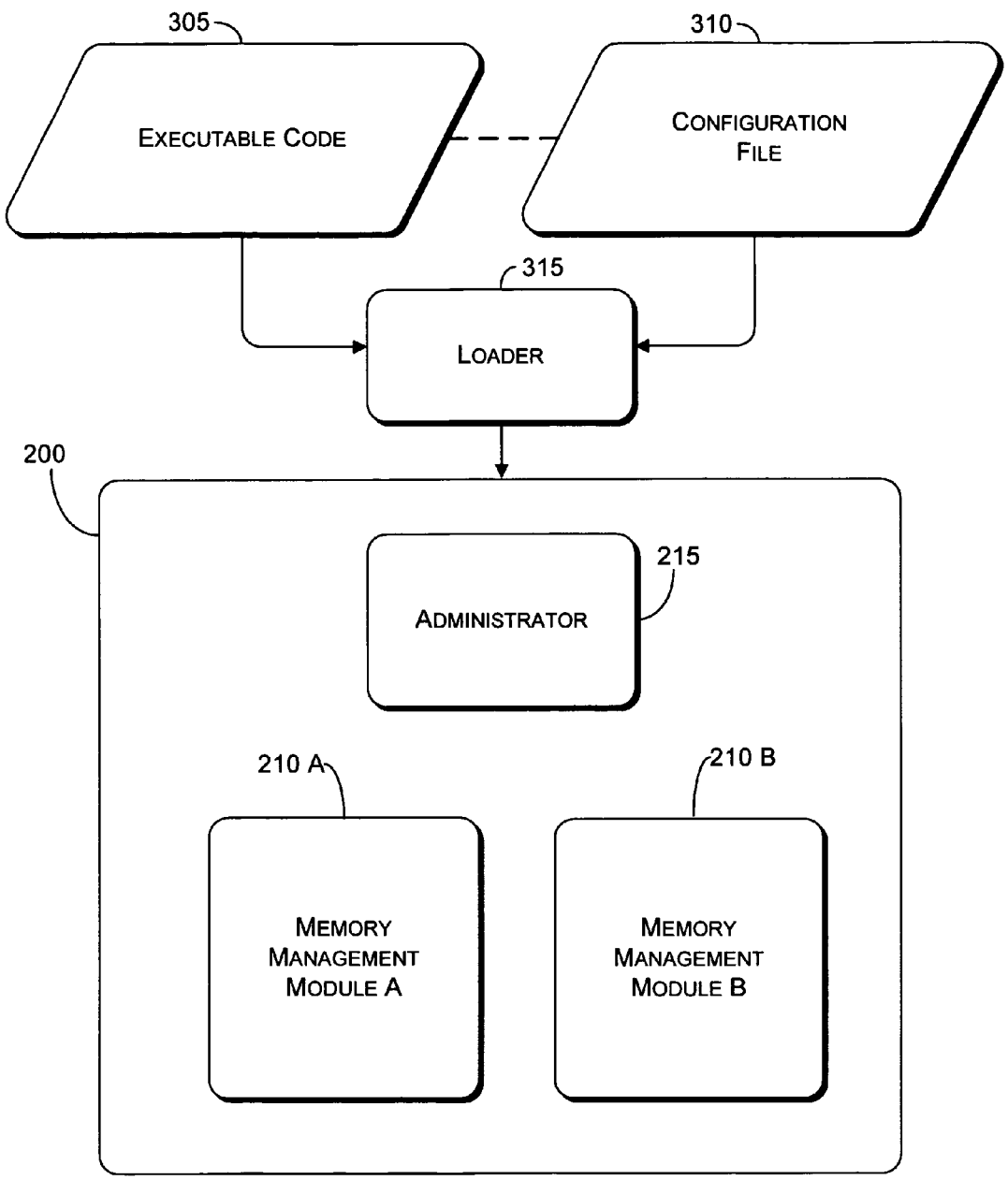
FIG. 3 shows an example data flow in accordance with an example implementation of memory management configuration.

FIG. 3 shows an example data flow in accordance with an example implementation of memory management configuration 120 (see FIG. 1).

Executable code 305 may refer to at least one application, program, method, function, or other assemblage of programmable and executable code that is intended for execution in runtime execution environment 200 on any of devices 105, 110, and 115.

Configuration file 310 may refer to a text file that is associated with executable code 305. In particular, configuration file 310 may be a text file (e.g., XML) listing parameters that indicate which one of plural memory management modules (i.e., garbage collectors) within runtime execution environment 200 is appropriate for execution of executable code 305 therein.

Configuration file 310 is associated with executable code 305, and therefore may be received into runtime execution environment 200 as an attachment to executable code 305. Alternatively, configuration file 310, though associated with executable code 305, may be received into runtime execution environment 200 separate from executable code 305. For example, configuration file 310 may be received into runtime execution environment 200 on-line via network 125 (see FIG. 1) from a developer or administrator for executable code 200; or, configuration file 310 may be received into runtime execution environment 200 in an off-line manner (e.g., via a transportable, computer-readable medium) from either of the aforementioned developer or administrator.

Loader 315 may refer to an assembly manager that may be invoked to locate and read assemblies as needed. Thus, loader 315 may garner executable code 305 and configuration file 310, either corporately or singularly, for loading into runtime execution environment 200. In effect, loader 315 may serve as the entry point for executable code 305 to the runtime execution environment 200. Typically, loader 315 may be disposed in an unmanaged execution environment (i.e., OS), although at least one example of runtime execution environment 200 may include loader 315 therein.

Administrator 215 may dynamically configure memory management in runtime execution environment 200 based on specifications and/or parameters contained within configuration file 310. To that end, administrator 215 may serve as a repository for the specifications and/or parameters related to runtime execution environment 200. Thus, upon parsing particular specifications and/or parameters from configuration file 310, administrator 215 may compare the parsed data to the stored specifications and/or parameters stored therein to configure memory management for the execution of executable code 305 in runtime execution environment 200.

Examples of the aforementioned specifications and/or parameters, which may be distinguished merely as a matter of semantics, typically pertain to scalability and performance of runtime execution environment 200. That is, memory management within runtime execution environment 200 may be dynamically configured by administrator 215 in accordance with specifications and/or parameters within configuration file 310 based on a number of processors capable of simultaneously hosting of runtime execution environment 200 and the throughput capabilities of runtime execution environment 200 when executing executable code 305. However, scalability and performance are only examples of such specifications and/or parameters. Further examples of such specifications and/or parameters, as they relate to runtime execution environment 200, may include, but are still not limited to: the availability of resources including memory capacity, a quantity of processors, a quantity of running instances, power available, latency (i.e., the ability of runtime execution environment 200 to interact with executable code 305), and time required to execute executable code 305.

Further still, according to at least one alternative example, administrator 215 may compare specifications and/or parameters contained within configuration file 310 to specifications and/or parameters related to runtime execution environment 200 to dynamically configure other execution-related modules within runtime execution environment 200. That is, the dynamic configuration described herein is not limited to memory management, and therefore such limitations should not be inferred.

Regardless, according to the one or more example implementations described in relation to FIG. 3, either of memory management module A 210A and memory management module B 210B may be dynamically selected by administrator 215 as predicated by a comparison between the specifications and/or parameters contained therein and the specifications and/or parameters pertaining to the execution of executable code 305 in runtime execution environment 200. Examples of such dynamic selections are described below.

Memory management module A 210A may refer to a work station garbage collector (i.e., WksGC), which may be characterized by a short pausing time, thus enabling garbage collection concurrent with execution of executable code 305. Such garbage collector may be suitable for implementation when e.g., less than four processors host runtime execution environment 225 in which execution of executable code 305 is hosted. Thus, based on the comparison between specifications and/or parameters contained within configuration file 210 and those accessed by administrator 215, memory management module A 210A may be the garbage collector implemented for execution of executable code 305 in runtime execution environment 200.

Memory management module B 210B may be refer to a server garbage collector (i.e., SvrGC), which may be suitable for implementation when e.g., four or more processors host runtime execution environment 225 in which execution of executable code 305 is hosted. Thus, based on the comparison between specifications and/or parameters contained within configuration file 210 and those accessed by administrator 215, memory management module B 210B may be dynamically selected by administrator 215 when memory allocated for execution of executable code 305 is divided into heaps assigned to a particular processor and is further collected in parallel by plural processors. That is, memory management module B 210B may be suitable when executable code 305 exhibits uniform behavior for a corresponding worker thread.

Figure 4:
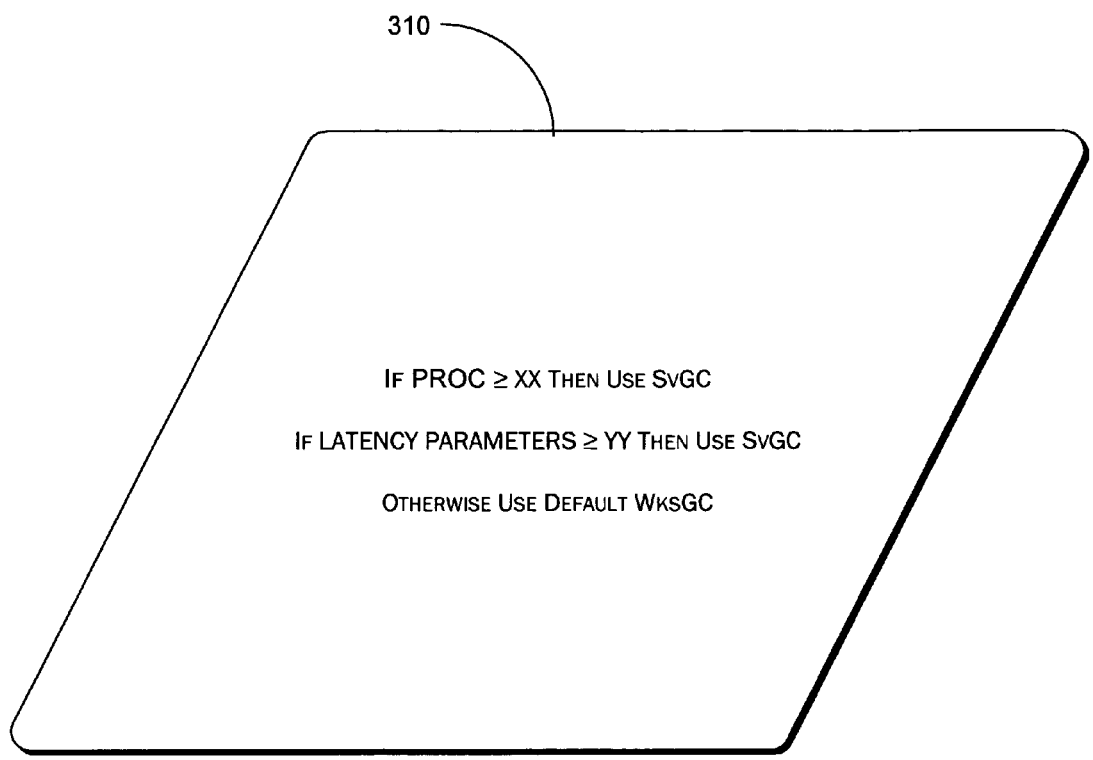
FIG. 4 shows an example configuration file in accordance with the example of FIG. 3.

FIG. 4 shows an example implementation of configuration file 310. More particularly, FIG. 4 illustrates that configuration file 310 may be a text file (e.g., XML) that contains parameters established by a developer or administrator associated with executable code 305, but does not touch, manipulate, or otherwise affect actual code within executable code 305. The example of FIG. 4 shows that a SvrGC is to be utilized if the number of processors associated with runtime execution environment 200 equals or exceeds the imaginary parameter "XX"; or if the latency tolerance parameters of runtime execution environment 200, when executing executable code 200, equals or exceeds the imaginary parameters "YY."

Figure 5:
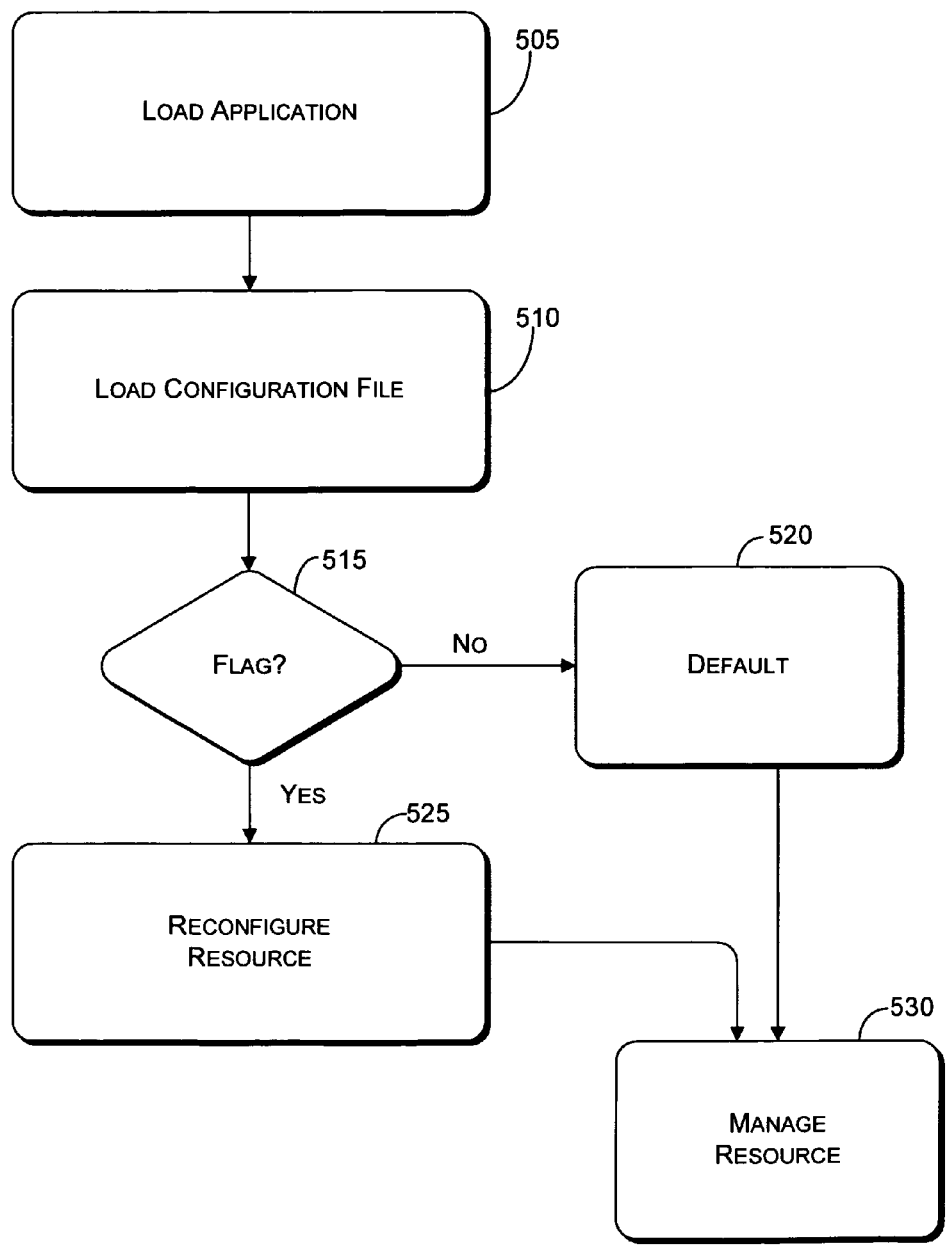
FIG. 5 shows an example processing flow in accordance with an example implementation of memory management configuration.

FIG. 5 shows example processing flow 500 corresponding to at least one example implementation of dynamic memory management configuration 120 (see FIG. 1). Example processing flow 500 is described below with references to features from FIGS. 1-4, although such implementations are provided only as examples and are not intended to be construed in any limiting manner.

Block 505 may refer to executable code 305 being loaded into runtime execution environment 200 by loader 315.

Block 510 may refer to configuration file 310 being loaded into runtime execution environment 200 by loader 315. Configuration file may refer to a text file (e.g., XML) listing parameters that indicate which one of plural memory management modules (i.e., garbage collectors) within runtime execution environment 200 is appropriate for execution of executable code 305 therein. Configuration file 310 may be loaded into runtime execution environment 200 as an attachment to executable code 305 or separate from executable code 305. In the latter case, configuration file 310 may be loaded, directly or indirectly, from a developer or user, into runtime execution environment 200 either on-line via network 125 (see FIG. 1) or in an off-line manner.

Decision 515 may refer to a determination, by administrator 215, of whether a flag within configuration file 310 indicates that default values have been exceeded for at least one of the specifications and/or parameters pertaining to execution of executable code 305 in runtime execution environment 200 upon which dynamic memory management configuration may be predicated. As described above, examples of such specifications and/or parameters include, but are not limited to scalability, performance, resource availability (e.g., memory, processors, running instances, power), latency, and processing time.

Block 520 may refer to, upon negative decision 515, a default to a predetermined one of memory management modules 210A or 210B. Between a WksGC as memory management module A 210A and a SvrGC as memory management module B 210B, WksGC 210A may typically, though by no means exclusively, be the default garbage collector in runtime execution environment 200.

Block 530 may refer to resource management by the default memory management module. That is, if threshold values for scalability, performance, resource availability, latency, and processing time, with regard to execution of executable code 305 in runtime execution environment 200 are not exceeded, either singularly or in various combinations, garbage collection may be implemented by the default memory management module (e.g., WksGC).

It is noted that the aforementioned threshold values are not specified herein. That is because such values may clearly be varied upon the judgment and/or preferences of at least one of the developer and administrator for executable code 305. Suffice it to say, any one or more of the aforementioned specifications and/or parameters may be utilized as the determining factor upon which dynamic memory management configuration may be predicated, and therefore may be the basis for decision 515.

Block 525 may refer to, upon positive decision 515, dynamic configuration of the execution of executable code 305 to a predetermined one of memory management modules 210A or 210B. If WksGC as memory management module A 210A is the default memory management module, then SvrGC as memory management module B 210B, WksGC 210A may be dynamically implemented if a threshold value for any one or more of scalability, performance, resource availability, latency, and processing time, with regard to execution of executable code 305 in runtime execution environment 200 is exceeded.

Block 530 may refer to resource management by the dynamically selected memory management module. That is, if a threshold value for at least one of scalability, performance, resource availability, latency, and processing time, with regard to execution of executable code 305 in runtime execution environment 200 is exceeded, memory management may be reconfigured and garbage collection may be implemented by the e.g., SvrGC.

It is noted that, although the example of FIG. 5 is description with reference to WksGC being the default memory management module, implementations of memory management configuration 120 are not so limited. Either WksGC or SvrGC may be implemented as a default memory management module. Further, at least one alternative embodiment may contemplate dynamic configuration of additional memory management modules corresponding to runtime execution environment 200. That is, the example implementations described herein are not limited to WksGC and SvrGC.

Further still, the example limitations described herein are not limited to just dynamic configuration of memory management modules. Rather, further processing modules related to runtime execution environment 200 may be dynamically configured (i.e., without recompiling of executable code 305) upon loading executable code 305 within runtime execution environment 200 without touching or otherwise affecting executable code 305. That is, configuration file 310 enables on-the-fly reconfiguration of the behavior of an application in a managed execution environment at any time beyond compile time or initial runtime.

It is to be understood that the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method, comprising:
in an executing runtime execution environment:
loading a module of executable code;
loading a configuration file associated with the module of executable code;
within the executing runtime execution environment, dynamically selecting a memory management module from a plurality of memory management modules based on a comparison of parameters in the configuration file to capabilities of the runtime execution environment when executing the module of executable code including a number of processors simultaneously hosting the runtime execution environment and a throughput capability of the runtime execution environment, the plurality of memory management modules comprising a workstation garbage collector and a server garbage collector.

2. The method according to claim 1, wherein the configuration file is a text file comprising at least one conditional statement relating to at least one of the parameters related to capabilities of the runtime execution environment.

3. The method according to claim 1, wherein the configuration file is attached to the module of executable code.

4. The method according to claim 1, wherein the configuration file is received separately from the module of executable code.

5. The method according to claim 1, wherein the selecting is based on performance parameters specified in the configuration file.

6. The method according to claim 1, wherein the selecting is based on scalability parameters specified in the configuration file.

7. The method according to claim 1, wherein the selecting is based on parameters pertaining to resource availability specified in the configuration file.

8. The method of claim 1, wherein the selecting is based a comparison of parameters pertaining to resource availability specified in the configuration file and parameters related to the executing runtime execution environment.

9. A system, comprising:
a plurality of memory resources comprising a memory;
a loader to load an executable code;
plural management modules to manage the plurality of memory resources during execution of the executable code, the plural of management modules comprising a workstation garbage collector and a server garbage collector; and
an administrative module to, from within an executing runtime execution environment, dynamically select at least one of the management modules based on a comparison of parameters in a configuration file associated with the executable code to capabilities of the runtime execution environment when executing the executable code including a number of processors simultaneously hosting the runtime execution environment and a throughput capability of the runtime execution environment.

10. The system according to claim 9, wherein the system is a managed execution environment.

11. The system according to claim 9, wherein the loader is to further receive the configuration file as an attachment to the executable code.

12. The system according to claim 9, wherein the loader is to further receive the configuration file in an off-line manner separate from the executable code.

13. The system according to claim 9, wherein the plural management modules are garbage collectors.

14. The system according to claim 9, wherein the administrative module is to dynamically select at least one of the management modules when a flag in the configuration file is referenced upon initialization of the executable code.

15. The system according to claim 9, wherein the administrative module is to select at least one of the management modules when a flag in the configuration file indicates that a number of resources capable of interacting with the system exceed default parameters.

* * * * *